United States Patent [19]
Satoh

[11] Patent Number: 6,122,446
[45] Date of Patent: Sep. 19, 2000

[54] BLUR CORRECTION CAMERA

[75] Inventor: Tatsuya Satoh, Hachioji, Japan

[73] Assignee: Olympus Optical Co., Ltd., Tokyo, Japan

[21] Appl. No.: 09/299,433

[22] Filed: Apr. 26, 1999

[30] Foreign Application Priority Data

May 8, 1998 [JP] Japan ................................. 10-125911

[51] Int. Cl.[7] .................................................. G03B 17/00
[52] U.S. Cl. ................................................ 396/52; 396/55
[58] Field of Search .............................. 396/52, 53, 54, 396/55

[56] References Cited

U.S. PATENT DOCUMENTS

| | | | |
|---|---|---|---|
| 5,790,490 | 8/1998 | Satoh et al. ................................. | 396/52 |
| 5,842,054 | 11/1998 | Suzuki et al. ............................... | 396/55 |
| 5,937,214 | 8/1999 | Shintani et al. ........................... | 396/55 |
| 6,035,130 | 3/2000 | Satoh ........................................ | 396/52 |

FOREIGN PATENT DOCUMENTS 9-304803  11/1997  Japan .

*Primary Examiner*—Russell Adams
*Attorney, Agent, or Firm*—Frishauf, Holtz, Goodman, Langer & Chick, P.C.

[57] ABSTRACT

The present invention aims at providing a blur correction camera in which an image movement (blur) amount on an image forming plane is displayed more exactly based on the actual states of a camera shake and a blur correcting member. The blur correction camera includes a camera shake sensing section for sensing a camera shake, a blur correcting member for correcting an amount of image movement due to the camera shake, a first image movement amount arithmetic section for calculating an image movement amount on a film plane in response to an output of the camera shake sensing section, a second image movement amount arithmetic section for calculating an image movement amount on the film plane in response to an output of the camera shake sensing section when the image movement amount is corrected by the blur correcting member, and a third image movement amount arithmetic section for calculating a difference between an arithmetic result of the first image movement amount arithmetic section and that of the second image movement amount arithmetic section.

23 Claims, 7 Drawing Sheets

BLUR CORRECTION CAMERA

BACKGROUND OF THE INVENTION

The present invention relates to a blur correction camera having a function of sensing a camera shake of a photographer and correcting a blur due to the camera shake.

Conventionally various techniques of blur correction cameras having a function of sensing a camera shake and correcting a blur caused by the camera shake have been proposed.

For example, Jpn. Pat. Appln. KOKAI Publication No. 9-304803 discloses a technique of reducing a blur display amount during the blur correction to about one-third a blur display amount not during the blur correction when a camera shake is sensed and its corresponding blur state is displayed in real time. According to this technique, a user can feel a camera performing a blur correcting operation even in a lens shutter camera or a wide-angle shot in which basically the user did not really feel a blur correcting operation in a finder optical system (prior art 1).

Another technique of sensing a camera shake and decentering part (lens) of a shooting optical system according to the camera shake to prevent an image from moving on an image forming plane, is developed. In this technique, a user can really feel a single-lens reflex camera performing a blur correcting operation through a finder image (prior art 2).

In prior art 1, a blur display amount is uniformly set to about one-third during the blur correction; however, the actual blur amount of an image formed on an image forming plane does not always correspond to the blur display amount. The blur display amount becomes larger or smaller than one-third of amount, depending upon the conditions (frequency and amplitude) of a camera shake and the states of a blur correction mechanism. The amount is therefore incorrect.

In prior art 2, even though a lens as described above is employed, an image blur cannot be eliminated completely and a photographer cannot know a level of the remaining image blur.

BRIEF SUMMARY OF THE INVENTION

The present invention has been developed in order to resolve the above problems and its object is to provide a blur correction camera capable of displaying an amount of image movement (blur) on an image forming plane more exactly based on the actual conditions of a camera shake and the operation states of a blur correcting member.

In order to attain the above object, according to a first aspect of the present invention, there is provided a blur correction camera comprising a sensing member for sensing a camera shake, and arithmetic means for calculating a difference between a movement amount of an image on a film plane and a movement amount of a blur-corrected image on the film plane in response to an output of the sensing member to obtain an actual blur amount.

According to a second aspect of the present invention, there is provided a blur correction camera comprising sensing means for sensing a camera shake;

blur correcting means for correcting an amount of image movement due to the camera shake, first arithmetic means for calculating an image movement amount on a film plane in response to an output of the sensing means, second arithmetic means for calculating an image movement amount on the film plane in response to an output of the sensing means, when the image movement amount is corrected by the blur correcting means, and third arithmetic means for calculating a difference between an arithmetic result of the first arithmetic means and an arithmetic result of the second arithmetic means.

According to a third aspect of the present invention, there is provided a blur correction camera comprising sensing means for sensing a camera shake, blur correcting means for correcting an image blur due to the camera shake, by driving part of a shooting optical system, first arithmetic means for calculating an image movement amount on a film plane in response to an output of the sensing means when the image movement amount is not corrected, and outputting the image movement amount as a first arithmetic result, second arithmetic means for calculating an image movement amount on the film plane in response to the first arithmetic result when the image movement amount is corrected by the blur correcting means, and outputting the image movement amount as a second arithmetic result, third arithmetic means for calculating a difference between the first arithmetic result and the second arithmetic result and outputting the difference as a third arithmetic result, and display means for displaying the third arithmetic result as an actual blur amount for a predetermined period of time after completion of exposure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will now be described with reference to the accompanying drawings.

Figure 1:
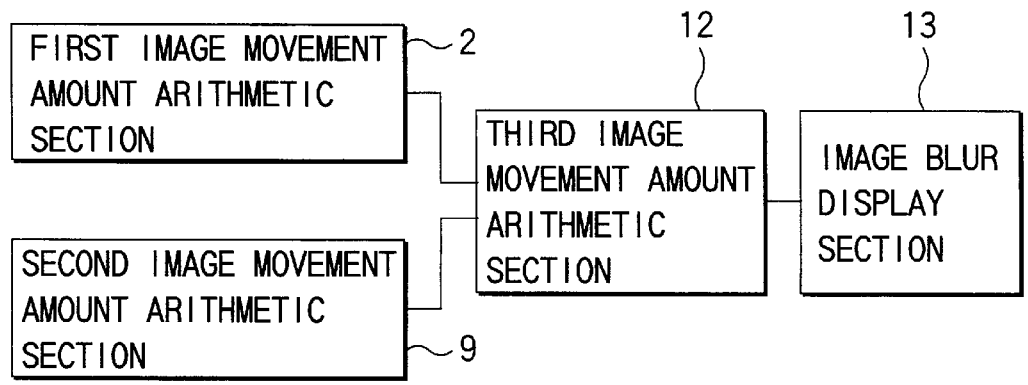
FIG. 1 is a conceptual diagram of a blur correction camera according to a first embodiment of the present invention.

FIG. 1 is a conceptual diagram of a blur correction camera according to a first embodiment of the present invention.

In the blur correction camera shown in FIG. 1, an output of a first image movement amount arithmetic section 2 serving as a first arithmetic means and that of a second image movement amount arithmetic section 9 serving as a second arithmetic means are connected to their respective inputs of a third image movement amount arithmetic section 12 serving as a third arithmetic means. An output of the section 12 is connected to an input of an image blur display section 13 serving as a display means.

The first image movement amount arithmetic section 2 calculates an amount of image movement to be caused commonly based on the current camera shake conditions and focal length and exposure time information. In contrast, the second image movement amount arithmetic section 9 calculates a degree of image movement based on information on an operation state (position) of a member to be driven for the blur correcting operation, such as a lens and a film.

Arithmetic results of the first and second image movement amount arithmetic sections 2 and 9 are sent to the third image movement amount arithmetic section 12. The section 12 determines a difference between the arithmetic results of the two sections 2 and 9. The reason for this calculation is that the difference corresponds to the actual image movement amount remaining on an image forming plane.

An arithmetic result of the third image movement amount arithmetic section 12 is transmitted to the image blur display section 13. The section 13 displays prescribed information on an actual image movement amount remaining on the image forming plane.

With the foregoing constitution and function, the actual image movement amount remaining on the image forming plane can be displayed. Accordingly, a photographer sees the display and knows the actual state of an image.

Figures 2A, 2B:
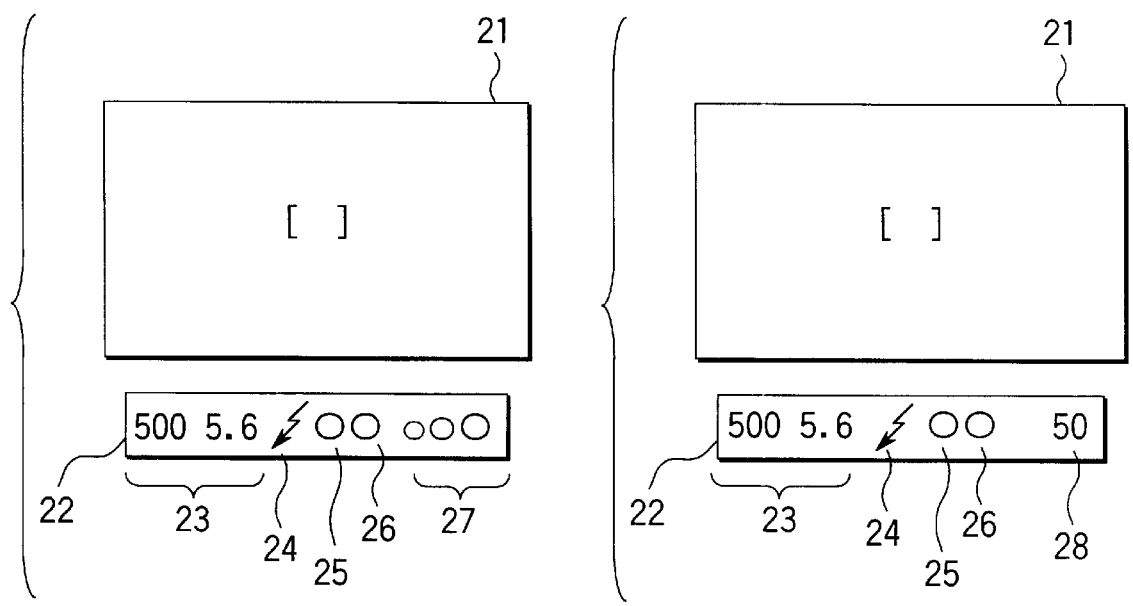
FIG. 2A is a view showing an example of finder display of a image blur display section 13 of the blur correction camera according to the first embodiment.
FIG. 2B is a view of another example of finder display of the image blur display section 13.

FIGS. 2A and 2B show examples of finder display of the image blur display section 13 described above.

In these examples, reference numeral 21 indicates a finder frame, 22 shows a shooting information display section for displaying shooting information, 23 represents an exposure time and aperture display section for displaying exposure time and an aperture, 24 denotes a stroboscope charging display section for displaying a charging state of a stroboscope, 25 indicates an AF display section for displaying an automatic focusing state, and 26 denotes a blur correction mechanism operation display section for displaying an operation of a blur correction mechanism.

More specifically, in FIG. 2A, reference numeral 27 denotes a first image blur display section corresponding to the above image blur display section 13 and including well-known LEDs and LCDs. This display section displays the actual image blur state on three levels. For example, when an image blur is very large, all three LEDs turn on. When it is very small, only a left one of them turns on.

In FIG. 2B, reference numeral 28 represents a second image blur display section corresponding to the above image blur display section 13. This display section displays an absolute value (unit: $\mu$m) of the actual image movement amount remaining on an image forming plane. Needless to say, the larger the absolute value, the larger the actual image movement amount.

Figure 3:
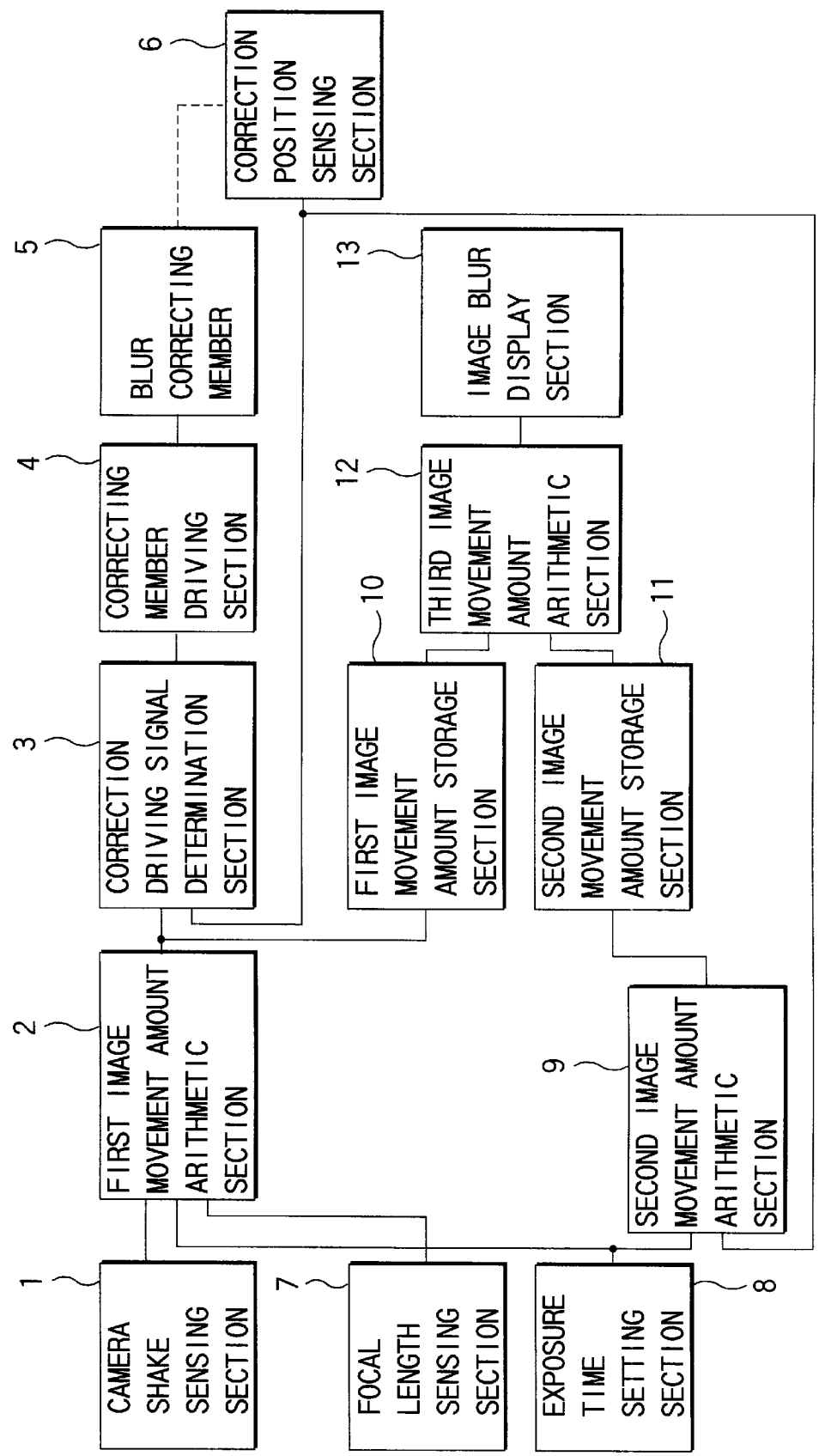
FIG. 3 is a block diagram showing a constitution of the blur correction camera of FIG. 1 more specifically.

FIG. 3 shows a constitution of the blur correction camera of FIG. 1 more specifically.

The same reference numerals in FIGS. 1 and 3 denote the same constituting elements.

Referring to FIG. 3, an output of a camera shake sensing section 1 serving as a sensing means is connected to an input of the first image movement amount arithmetic section 2. An output of a focal length sensing section 7 and that of an exposure time setting section 8 are also connected to their respective inputs of the section 2.

The output of the section 2 is connected to an input of a first image movement amount storage section 10 and that of a correcting member driving section 4 via a correction driving signal determination section 3. The section 4 is connected to a blur correcting member 5. In order to sense a correction position of the member 5, a correction position sensing section 6 is arranged in the vicinity of the member 5. An output of the correction position sensing section 6 is fed back to an input of the correction driving signal determination section 3 and connected to an input of the second image movement arithmetic section 9.

The output of the exposure time setting section 8 is also connected to the input of the section 9, and an output of the section 9 is connected to an input of a second image movement amount storing section 11. The outputs of the first and second image movement amount storage sections 10 and 11 are connected to the inputs of the third image movement amount arithmetic section 12, and the output of the section 12 is connected to an input of the image blur display section 13.

In the foregoing constitution, the camera shake sensing section 1 senses a shake of a camera and, for example, a well-known constant angular velocity sensor (vibrating gyroscope) can be applied to the section 1. Camera shake information sensed by the camera shake sensing section 1 is sent to its subsequent first image movement amount arithmetic section 2.

The section 2 is supplied with both shooting focal length information from the focal length sensing section 7 and exposure time information from the exposure time setting section 8, and calculates an amount of image movement to be caused normally based on these information and the foregoing camera shake information.

To perform an image blur correcting operation, the image movement amount information obtained by the first image movement amount arithmetic section 2 is sent to its subsequent correction driving signal determination section 3. The section 3 determines a driving signal for driving the blur correcting member 5 to actually carry out a blur correcting operation. The driving signal is determined by adding correction position information of a correction device (which will be described later) to the image movement amount information obtained by the first image movement amount arithmetic section 2.

The driving signal determined by the correction driving signal determination section 3 is transmitted to the correcting member driving section 4. This section 4 is used to actually drive the blur correcting member 5, and a well-known actuator such as a DC motor and a voice coil can be applied to the section 4.

The correcting member driving section 4 drives the blur correcting member 5 to actually correct an image blur. As a specific example of the member 5, part (lens) of the shooting optical system, a film serving as an image forming plane, etc., can be applied.

An operation position of the blur correcting member 5 is sensed by the correction position sensing section 6. specifically, the section 6 is constituted of a well-known PI (photo-interrupter), a PR (photo-reflector) and the like. Actually, the sensing section 6 senses operation states of a series of gears and a reduction mechanism (neither of which is illustrated) which are interposed between the correcting member driving section 4 and blur correcting member 5. The information sensed by the section 6 is sent to the foregoing correction driving signal determination section 3 and used as a feedback signal for control of blur correction.

The feedback signal is also sent to the second image movement amount arithmetic section 9. The section 9 obtains an amount of image movement caused only by the driving operation of the blur correcting member 5 based on both the operation position information of the member 5 from the correction position sensing section 6 and the exposure time information from the exposure time setting section 8.

The image movement amounts obtained by the first and second image movement amount arithmetic sections 2 and 9 are temporarily stored in the first and second image movement amount storage sections 10 and 11, respectively, and read out of the third image movement amount arithmetic section 12. The section 12 determines a difference between arithmetic results of the two sections 2 and 9. The reason why the difference is determined has been described above.

The actual image movement amount remaining on the image forming plane can be obtained from a difference between the results calculated by the first and second image movement amount arithmetic sections 2 and 9. An arithmetic result of the third image movement amount arithmetic section 12 is supplied to the image blur display section 13. Based on the result, the section 13 displays information about the actual image movement amount remaining on the image forming plane in such a manner as shown in FIGS. 2A and 2B.

The constitution of the blur correction camera of the first embodiment has been described. FIG. 3 illustrates one camera shake sensing section 1, one correcting member driving section 4 and one correction position sensing section 6; however, usually, the number of sections 1, that of sections 4, and that of sections 6 are each two in order that they can be adapted to two directions of a yaw direction (horizontal direction of the shooting plane) and a pitch direction (vertical direction thereof) of a camera body.

The first, second and third image movement amount arithmetic sections 2, 9 and 12 each calculate an image movement amount in both the yaw and pitch directions, and finally the image blur display section 13 obtains a vector sum of the image movement amounts in the yaw and pitch directions to display an image blur.

An operation of the blur correction camera having the above constitution will now be described in detail with reference to the flowcharts of FIGS. 4 and 5.

Figure 4:
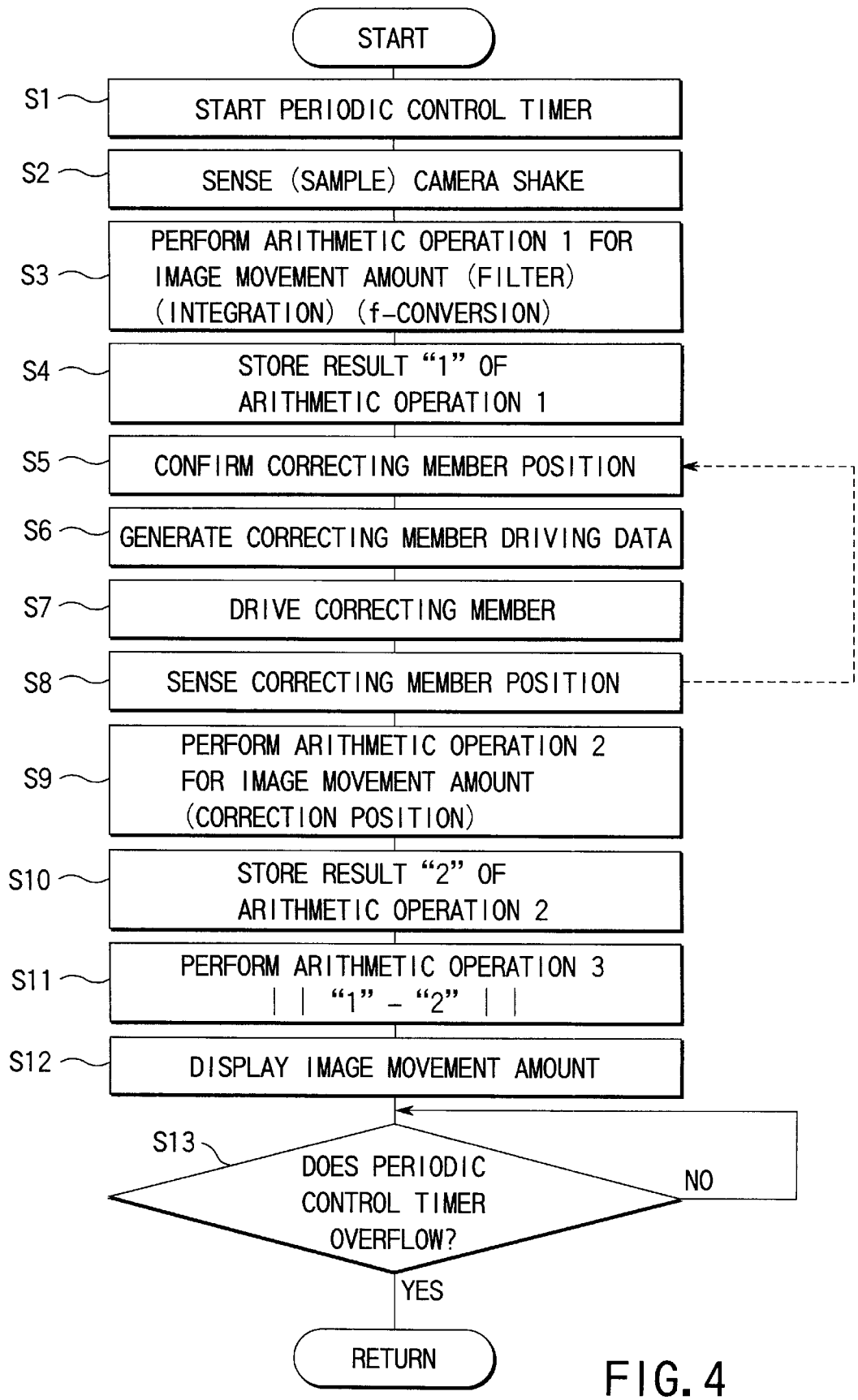
FIG. 4 is a flowchart showing a sequence of blur correcting operations for controlling a blur correcting operation, calculating an image movement amount and displaying an image blur in the blur correction camera of FIG. 1, the calculating and displaying operations being the features of the present invention.

The flowchart of FIG. 4 is directed to a sequence of blur correcting operations for controlling a blur correcting operation, calculating an image movement amount and displaying an image blur. The calculating and displaying operations are the features of the present invention. This sequence is repeated when a blur correcting operation is performed by the camera.

When the sequence starts, a periodic control timer for executing blur correction control in a fixed period starts (step S1). The timer makes the control stable, and time of about 1 mS can be set for the timer. It is needless to say that the present invention is not limited to this time.

Next, sampling of information on a camera shake sensed by the camera shake sensing section 1 is performed (step S2). Specifically, an output of the section 1 is A/D-converted and supplied into a blur correction control section (microcomputer), which is not shown.

An amount of image movement caused by the camera shake is calculated from the camera shake information, the shooting focal length information and the set exposure time information which have already been obtained. This calculation is performed by the first image movement amount arithmetic section 2. In advance of the calculation, a filtering operation for removing unnecessary signal components and an integrating operation for converting velocity information on the sensed camera shake into displacement information (step S3). The image movement amount calculated in step S3 is stored in the first image movement amount storage section 10 (step S4).

Then, the current positional information of the blur correcting member 5 is confirmed on the basis of information output from the correction position sensing section 6 (step S5). The position of the member 5 is detected in step S8, which will be described later.

The correction driving signal determination section 3 generates (determines) data for driving the blur correcting member 5 based on the image movement amount calculated in step S3 and the position of the blur correcting member 5 confirmed in step S5 (step S6). Subsequently, the correcting member driving section 4 drives the blur correcting member 5 based on the data determined in step S6 (step S7).

Then, the correction position sensing section 6 senses information on an operation position of the blur correcting member 5. This information is used for calculating an image movement amount in step S9 and also used as positional information for control of the blur correction in step S5 (used for executing this loop next time) (step S8).

After that, the second image movement amount arithmetic section 9 calculates an image movement amount corresponding to the set exposure time and obtained only by driving the blur correcting member 5, on the basis of the information of the member 5 sensed in step S8 (step S9). The calculated image movement amount is stored in the second image movement amount storage section 11 (step S10).

Thereafter, the third image movement arithmetic section 12 determines a difference between the first and second image movement amounts stored in steps S4 and S10 (step S11). This difference corresponds to the present image movement amount remaining on the image forming plane, in spite of the blur correcting operation.

In response to the difference determined in step S11, the image blur display section 13 displays the image movement (blur) amount (step S12). This display pattern is the same as that described with reference to FIGS. 2A and 2B.

It is then determined whether the periodic control timer started in step S1 has overflowed or whether a predetermined period of time has elapsed. If the timer has not overflowed, an operation of step S13 is repeated until it overflows. If the timer has overflowed, the flow returns to step S1.

According to the above-described steps, the flow is repeated during the blur correction. After step S13, the flow is repeated from step S1. The above loop takes a short time (e.g., 1 mS) and the image blur display in step S12 can be changed frequently. Since, however, the frequent change in display is a nuisance, the display can be changed once every several tens to several hundreds of milliseconds (mS).

Referring to the flowchart of FIG. 5, a sequence of blur correcting operations during the exposure, which is executed by the camera of the first embodiment, will now be described in detail.

First it is determined whether an instruction to start exposure is given or not (step S21). If there is no instruction, step S21 is repeated. If there is an instruction, the flow advances to the next step to start a blur correcting operation (step S22).

Then, an exposure operation is started (step S23) to continuously perform the blur correcting operation (step S24). In step S24, basically the same operation as described above with reference to FIG. 4 is carried out, except for the display of an image movement amount using the image blur display section 13 in step S12 shown in FIG. 4.

It is then determined whether a predetermined period of time has elapsed or not (step S25). If the time has not elapsed, the flow returns to step S24 to continuously perform the above blur correcting operation. If it has elapsed, the exposure is completed (step S26).

After that, the blur correcting operation is completed (step S27), and a value obtained by subtracting an amount of image movement caused by an operation of the blur correcting member during the exposure from that of image movement caused only by a camera shake during the exposure, or the actual image movement amount remaining on the image forming plane during the exposure is displayed (step S28). This corresponds to the foregoing step S12 in FIG. 4. After the image movement amount is displayed on the image blur display section 13 for a given period of time, all the operations are finished.

A blur correction camera according to a second embodiment of the present invention will now be described.

The following description is directed to only the points different from those of the first embodiment.

Figure 6:
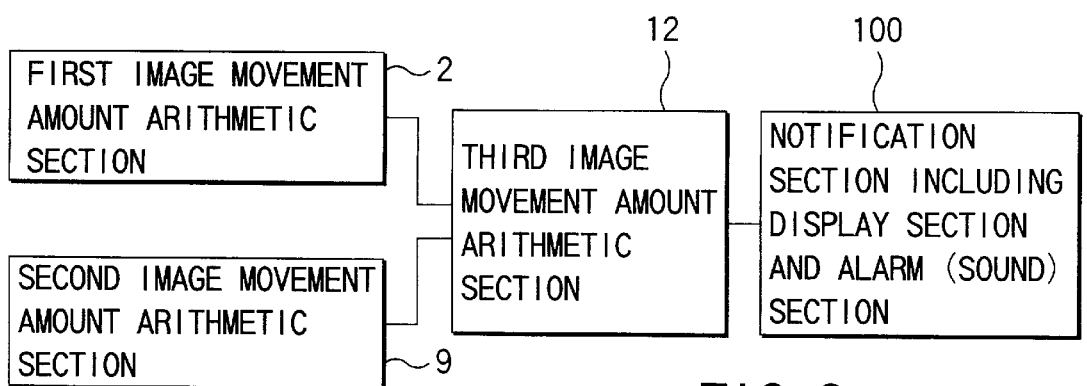
FIG. 6 is a conceptual diagram of a blur correction camera according to a second embodiment of the present invention.

FIG. 6 is a conceptual diagram of the blur correction camera of the second embodiment of the present invention.

In the foregoing first embodiment, the image blur display section 13 displays predetermined information on the actual image movement amount remaining on the image forming plane, based on information about arithmetic results. In contrast, the second embodiment is featured in that the display section 13 is replaced with a notification section 100.

The notification section 100 includes a display section and an alarm section (sound section). Assume that the notification section 100 is formed of a display section including a plurality of LEDs. The larger the actual blur amount, the more the LEDs turning on. If an alarm section is adopted in the notification section 100, an image blur is notified by, e.g., voice. The actual blur amount is displayed after exposure is completed. The plurality of LEDs are provided in a finder.

Figure 7:
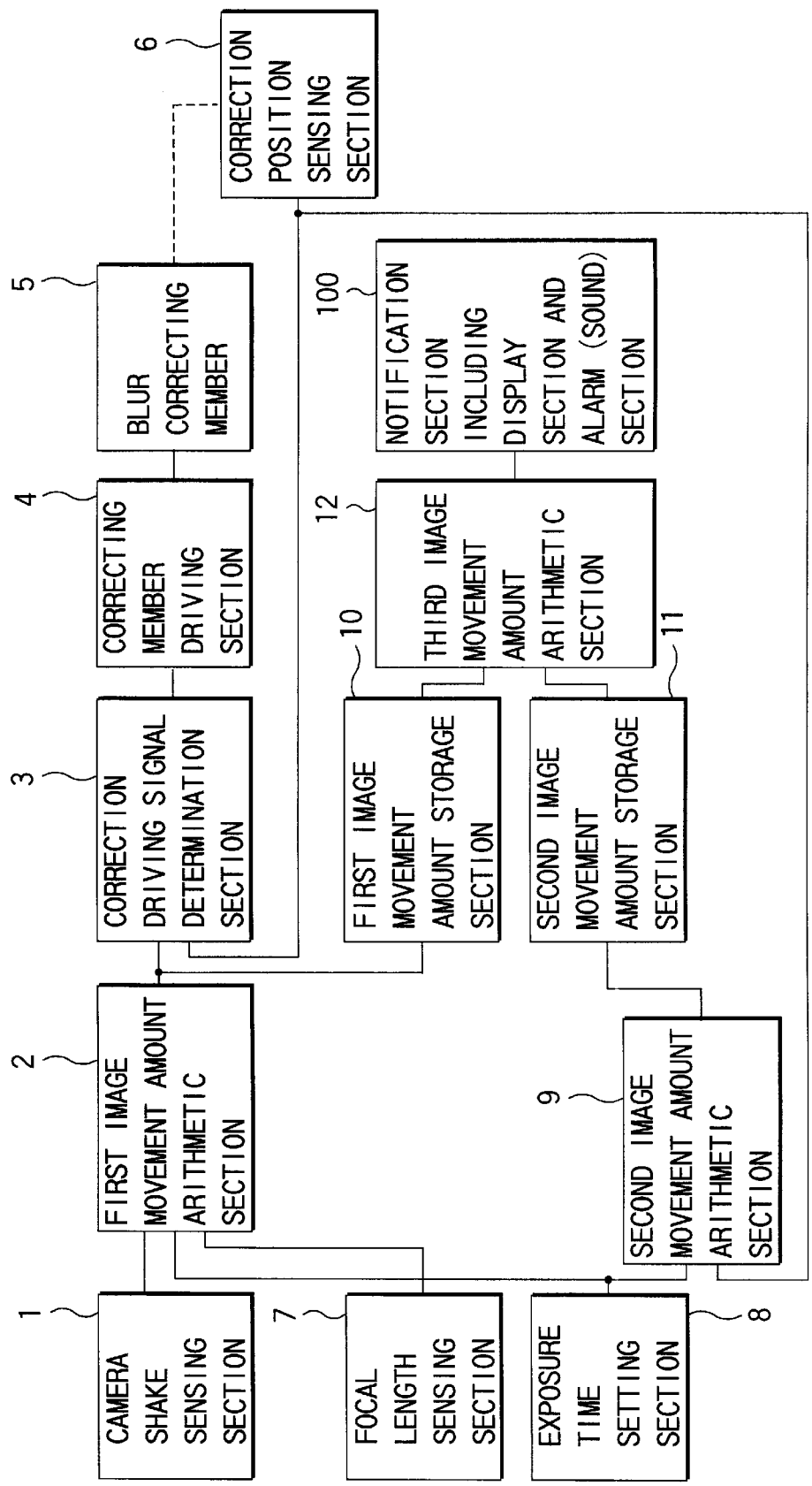
FIG. 7 is a block diagram showing a constitution of the blur correction camera of FIG. 6 more specifically.

In the arrangement shown in FIG. 7, too, the notification section 100 has the same feature as described above.

Referring to the flowcharts of FIGS. 8 and 9, an operation of the blur correction camera according to the second embodiment will now be described.

Figure 8:
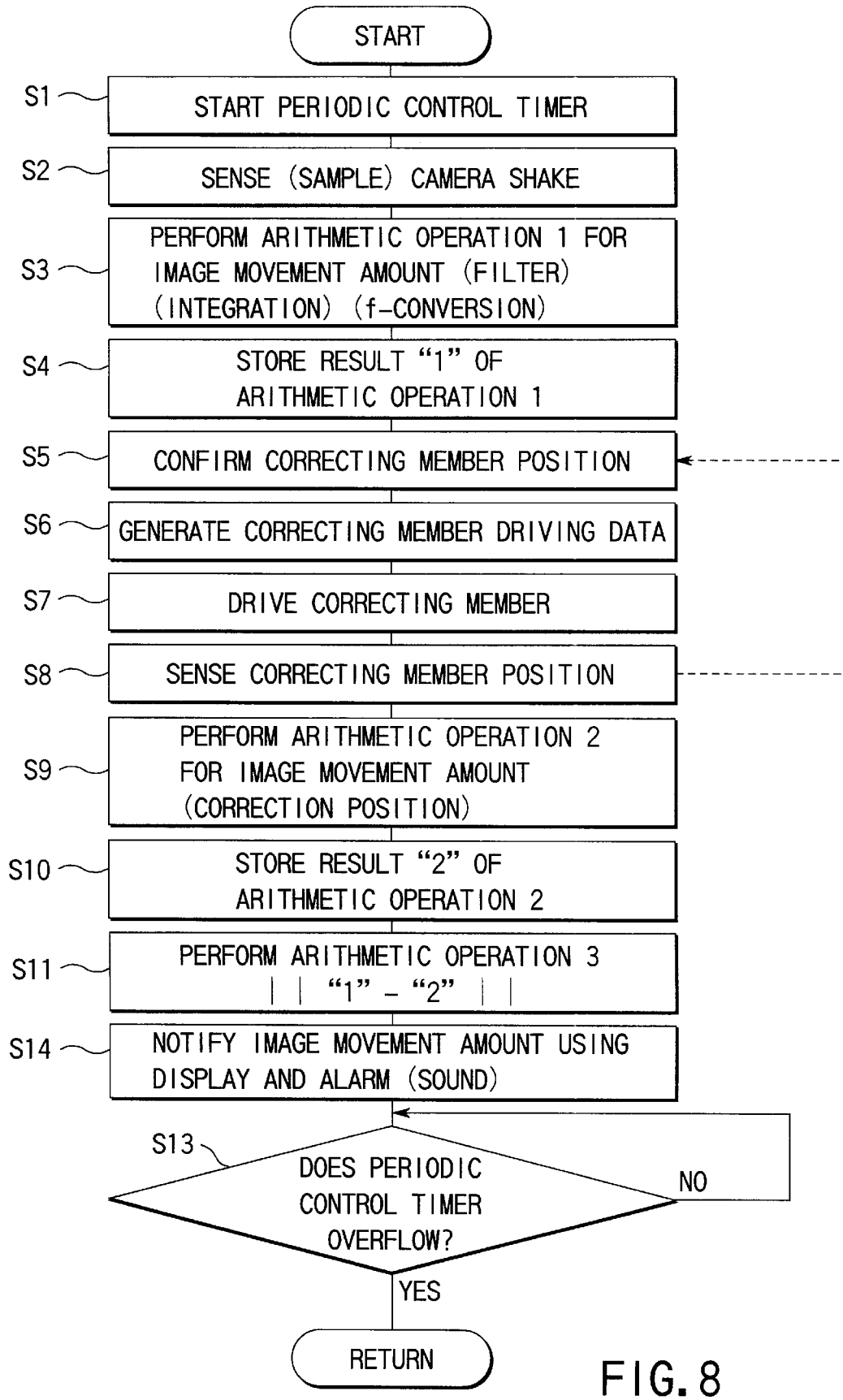
FIG. 8 is a flowchart showing a sequence of blur correcting operations for controlling a blur correcting operation, calculating an image movement amount and displaying an image blur in the blur correction camera of FIG. 6, the calculating and displaying operations being the features of the present invention.

It is in step S14 that FIG. 8 differs from FIG. 4 corresponding to the first embodiment. In the sequence shown in FIG. 4, the image blur display section 13 displays an image movement (blur) amount in reply to the arithmetic results of an image blur (step S12 in FIG. 4). Contrastingly, in step S14 of FIG. 8, an image movement amount is notified. This notification includes an alarm (sound) notification as well as the above display notification.

Figure 5:
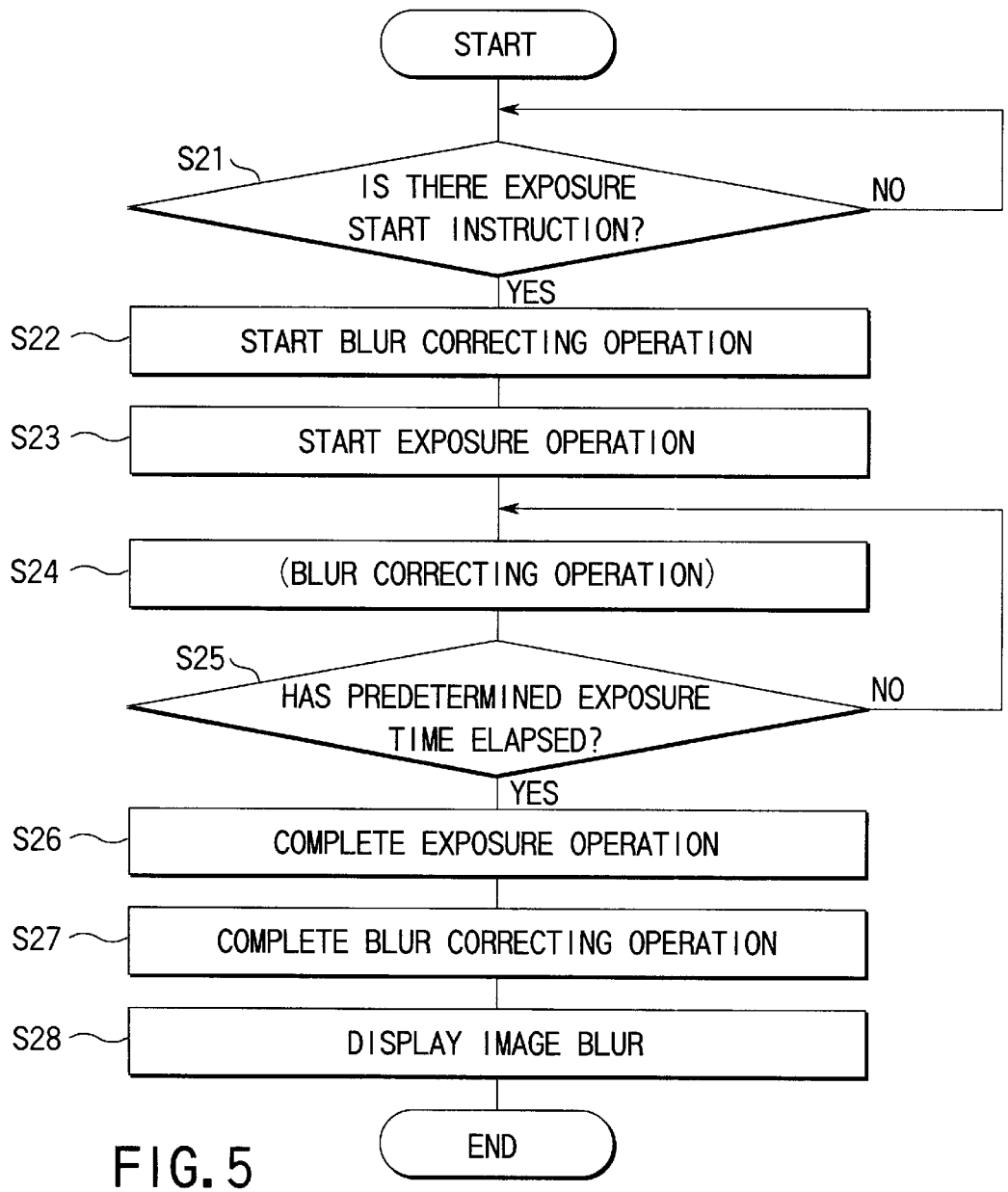
FIG. 5 is a flowchart showing a sequence of blur correcting operations during the exposure which is executed by the blur correction camera according to the first embodiment.
Figure 9:
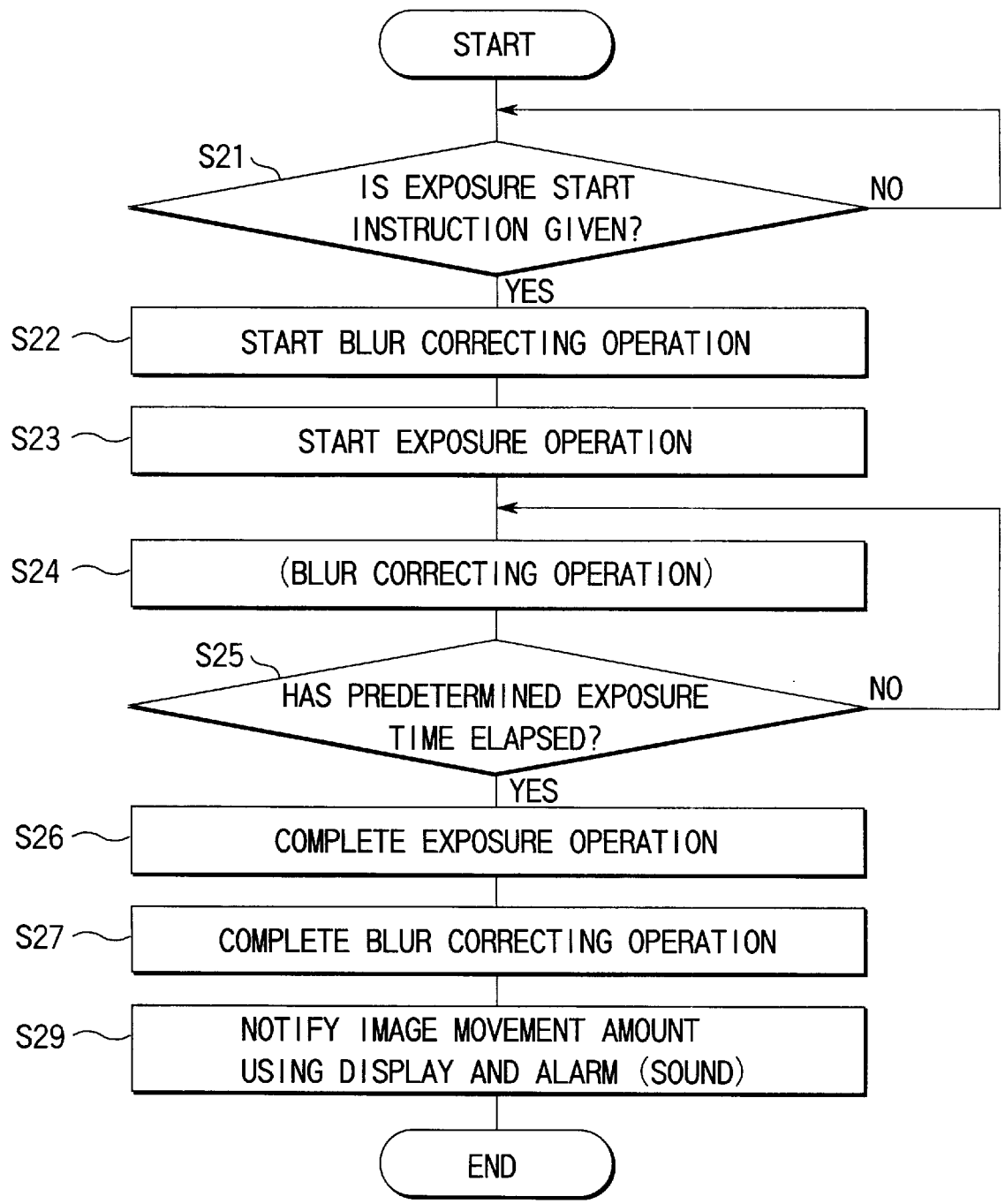
FIG. 9 is a flowchart showing a sequence of blur correcting operations during the exposure which is executed by the blur correction camera according to the second embodiment.

Furthermore, it is in step S29 that FIG. 9 differs from FIG. 5 corresponding to the first embodiment. In the first embodiment, a value obtained by subtracting an amount of image movement caused by an operation of the blur correcting member during the exposure from that of image movement caused only by a camera shake during the exposure, or the actual image movement amount remaining on the image forming plane during the exposure is displayed (step S28 in FIG. 5). This corresponds to the above-described step S12 in FIG. 4.

In contrast, according to the second embodiment, a value obtained by subtracting an amount of image movement caused by an operation of the blur correcting member during the exposure from that of image movement caused only by a camera shake during the exposure, or the actual image movement amount remaining on the image forming plane during the exposure is notified (step S29 in FIG. 9). This notification includes a sound alarm and corresponds to the foregoing step S14 in FIG. 8.

In the blur correction camera described above, a value obtained by subtracting an amount of image movement caused by a blur correcting operation itself from that of image movement caused only by a camera shake is set as formed (remaining) image movement amount information, and this information is used for blur display. It is thus possible for a photographer to know the actual image movement (blur) amount on the image forming plane even in a blur correctable system. In view of this, the photographer can easily determine whether the current shooting is successful or whether the shooting should be performed again.

According to the present invention, since the actual image movement amount during the exposure is displayed after completion of the exposure, a user sees this display and knows how a just-taken picture is blurred.

The present invention is not limited to the above embodiments. Various changes and modifications can be made without departing from the scope of the subject matter of the present invention. For example, the present invention can be applied to not only an apparatus for correcting a blur by driving part of a lens but also a blur correction apparatus in which film driving prevents an image from moving due to a camera shake. In the latter apparatus, a user cannot basically confirm a degree of blur correction through a finder image; therefore, the display of an image blur state in the present invention is considered to be very useful.

As has been described above in detail, in the blur correction camera, a more exact image movement (blur) amount on the image forming plane can be displayed based on the actual states of a camera shake and a blur correcting member.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A blur correction camera comprising:

a sensing member for sensing a camera shake; and arithmetic means for calculating a difference between a movement amount of an image on a film plane and a movement amount of a blur-corrected image on the film plane in response to an output of the sensing member. to obtain an actual blur amount.

2. The blur correction camera according to claim 1, wherein the arithmetic means includes:

first arithmetic means for calculating a movement amount of an image on the film plane when a blur of the image is not corrected;

second arithmetic means for calculating a movement amount of an image on the film plane when a blur of the image is corrected; and third arithmetic means for calculating a difference between an arithmetic result of the first arithmetic means and an arithmetic result of the second arithmetic means.

3. The blur correction camera according to claim 1, wherein the movement amount of the image on the film plane corresponds to an operation amount of a blur correcting member.

4. The blur correction camera according to claim 1, further comprising notification means for notifying an arithmetic result of the arithmetic means as an actual blur amount.

5. The blur correction camera according to claim 4, wherein the notification means is display means.

6. The blur correction camera according to claim 5, wherein the display means includes a plurality of LEDs.

7. The blur correction camera according to claim 6, wherein the plurality of LEDs are provided in a finder.

8. The blur correction camera according to claim 6, wherein a larger number of LEDs turn on as the actual blur amount increases.

9. The blur correction camera according to claim 7, wherein a larger number of LEDs turn on as the actual blur amount increases.

10. The blur correction camera according to claim 4, wherein the notification means is alarm means.

11. The blur correction camera according to claim 10, wherein the alarm means is sound means using a voice.

12. The blur correction camera according to claim 4, wherein the actual blur amount is notified after completion of exposure.

13. The blur correction camera according to claim 8, wherein the actual blur amount is notified after completion of exposure.

14. The blur correction camera according to claim 9, wherein the actual blur amount is notified after completion of exposure.

15. A blur correction camera comprising:

sensing means for sensing a camera shake;

blur correcting means for correcting an amount of image movement due to the camera shake;

first arithmetic means for calculating an image movement amount on a film in response to an output of the sensing means;

second arithmetic means for calculating an image movement amount on the film in response to an output of the sensing means, when the image movement amount is corrected by the blur correcting means; and third arithmetic means for calculating a difference between an arithmetic result of the first arithmetic means and an arithmetic result of the second arithmetic means.

16. The blur correction camera according to claim 15, further comprising notification means for notifying an arithmetic result of the third arithmetic means as an actual blur amount.

17. The blur correction camera according to claim 16, wherein the notification means is alarm means.

18. The blur correction camera according to claim 17, wherein the alarm means is sound means for alarming by a voice.

19. The blur correction camera according to claim 16, wherein the notification means is display means.

20. The blur correction camera according to claim 15, wherein the actual blur amount is notified after completion of exposure.

21. A blur correction camera comprising:

sensing means for sensing a camera shake;

blur correcting means for correcting an image blur due to the camera shake, by driving part of a shooting optical system;

first arithmetic means for calculating an image movement amount on a film plane in response to an output of the sensing means when the image movement amount is not corrected, and outputting the image movement amount as a first arithmetic result;

second arithmetic means for calculating an image movement amount on the film plane in response to the first arithmetic result when the image movement amount is corrected by the blur correcting means, and outputting the image movement amount as a second arithmetic result;

third arithmetic means for calculating a difference between the first arithmetic result and the second arithmetic result and outputting the difference as a third arithmetic result; and display means for displaying the third arithmetic result as an actual blur amount for a predetermined period of time after completion of exposure.

22. The blur correction camera according to claim 21, wherein the display means includes a plurality of LEDs, and a larger number of LEDs turn on as the actual blur amount increases.

23. The blur correction camera according to claim 22, wherein the plurality of LEDs are provided in a finder.

* * * * *